United States Patent
Samuel

(10) Patent No.: US 9,825,754 B2
(45) Date of Patent: Nov. 21, 2017

(54) INDEPENDENT UART BRK DETECTION

(71) Applicant: Microchip Technology Incorporated, Chandler, AZ (US)

(72) Inventor: Roshan Samuel, Chandler, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 15/188,263

(22) Filed: Jun. 21, 2016

(65) Prior Publication Data

US 2016/0373238 A1 Dec. 22, 2016

Related U.S. Application Data

(60) Provisional application No. 62/183,006, filed on Jun. 22, 2015.

(51) Int. Cl.
| | |
|---|---|
| *H04L 7/00* | (2006.01) |
| *H04L 12/24* | (2006.01) |
| *H04L 12/26* | (2006.01) |
| *H04L 29/06* | (2006.01) |
| *G06F 13/42* | (2006.01) |

(52) U.S. Cl.
CPC ........ *H04L 7/0012* (2013.01); *G06F 13/4295* (2013.01); *H04L 7/005* (2013.01); *H04L 41/0681* (2013.01); *H04L 43/16* (2013.01); *H04L 69/28* (2013.01)

(58) Field of Classification Search
CPC ... H04L 7/0012; H04L 7/005; H04L 41/0681; H04L 43/16; H04L 69/28; G06F 13/4195
See application file for complete search history.

(56) References Cited

U.S. PATENT DOCUMENTS

| | | | |
|---|---|---|---|
| 6,243,034 B1 | 6/2001 | Regier | 341/166 |
| 7,414,553 B1 | 8/2008 | Tsyrganovich | 341/118 |
| 2004/0246997 A1* | 12/2004 | Ruat | G06F 13/385 370/509 |
| 2005/0188206 A1* | 8/2005 | Kwok | H04L 9/3271 713/176 |
| 2006/0077296 A1* | 4/2006 | Gudmundson | H03L 7/06 348/497 |
| 2011/0026572 A1* | 2/2011 | Kitahara | H04L 7/04 375/225 |
| 2012/0262122 A1 | 10/2012 | Sato | 320/128 |
| 2014/0265929 A1 | 9/2014 | Gossehelweg et al. | 315/307 |

OTHER PUBLICATIONS

International Search Report and Written Opinion, Application No. PCT/US2016/033225, 12 pages, dated Jul. 28, 2016.

* cited by examiner

*Primary Examiner* — Dac Ha
(74) *Attorney, Agent, or Firm* — Slayden Grubert Beard PLLC

(57) ABSTRACT

A universal asynchronous receiver/transmitter (UART) module is disclosed. The UART module may include a receiver unit being clocked by a programmable receiver clock configured to sample an incoming data signal and comprising a counter clocked by said receiver clock, wherein the counter is reset to start counting with every falling edge of the data signal and to trigger a BRK detection signal if the counter reaches a programmable threshold value.

17 Claims, 5 Drawing Sheets

INDEPENDENT UART BRK DETECTION

CROSS-REFERENCE TO RELATED APPLICATIONS

This application claims priority to U.S. Provisional Patent Application No. 62/183,006, filed Jun. 22, 2015, which is hereby incorporated by reference herein for all purposes.

TECHNICAL FIELD

The present disclosure relates to serial interfaces, in particular to a universal asynchronous receiver/transmitter (UART) interface with BRK detection.

BACKGROUND

UARTs are well known and commonly used in microcontrollers to provide a communication channel. A UART interface translates parallel data into a serial transmission form. Various types of protocols exists and are used in UART communication as defined by various communication standards such as EIA, RS-232, RS-422 or RS-485. Other protocols, such as the LIN protocol use the same interface configuration as a RS-232 interface.

SUMMARY

There exists a need to provide a UART that allows for automatic detection of a BRK regardless of when that BRK is received.

A universal asynchronous receiver/transmitter (UART) module is disclosed. The UART module may include a receiver unit being clocked by a programmable receiver clock configured to sample an incoming data signal and comprising a counter clocked by said receiver clock, wherein the counter is reset to start counting with every falling edge of the data signal and to trigger a BRK detection signal if the counter reaches a programmable threshold value.

In various embodiments, a universal asynchronous receiver/transmitter (UART) module is disclosed. The module may include a receiver unit being clocked by a programmable receiver clock configured to sample an incoming data signal and comprising a counter clocked by said receiver clock, wherein the counter is reset to start counting with every falling edge of the data signal and to trigger a BRK detection signal if the counter reaches a programmable threshold value.

In some embodiments, the programmable receiver clock may be coupled to a baud rate generator. In some embodiments, the counter stops counting on a rising edge of the data signal. In the same or alternative embodiments, the threshold value can be programmed to be 11.

In some embodiments, the receiver unit may include a state machine to control the counter. In such embodiments, the state machine is programmable to operate in different operating modes. Also in such embodiments, the interface may include a first in first out buffer memory receiving a plurality sampled data.

In various embodiments, a microprocessor is disclosed. The microprocessor may include a universal asynchronous receiver/transmitter (UART) module including a receiver unit being clocked by a programmable receiver clock configured to sample an incoming data signal and comprising a counter clocked by said receiver clock, wherein the counter is reset to start counting with every falling edge of the data signal and to trigger a BRK detection signal if the counter reaches a programmable threshold value.

In some embodiments, the programmable receiver clock may be coupled to a baud rate generator. In some embodiments, the counter stops counting on a rising edge of the data signal. In the same or alternative embodiments, the threshold value can be programmed to be 11.

In some embodiments, the receiver unit may include a state machine to control the counter. In such embodiments, the state machine is programmable to operate in different operating modes. Also in such embodiments, the interface may include a first in first out buffer memory receiving a plurality sampled data.

In various embodiments, a method for controlling a universal asynchronous receiver/transmitter (UART) module is disclosed. The method may include: clocking a receiver unit by a programmable receiver clock configured to sample an incoming data signal; resetting a counter clocked by said programmable receiver clock, wherein the counter is reset to start counting with every falling edge of the data signal; and triggering a BRK detection signal if the counter reaches a programmable threshold value.

DETAILED DESCRIPTION

Figure 1:
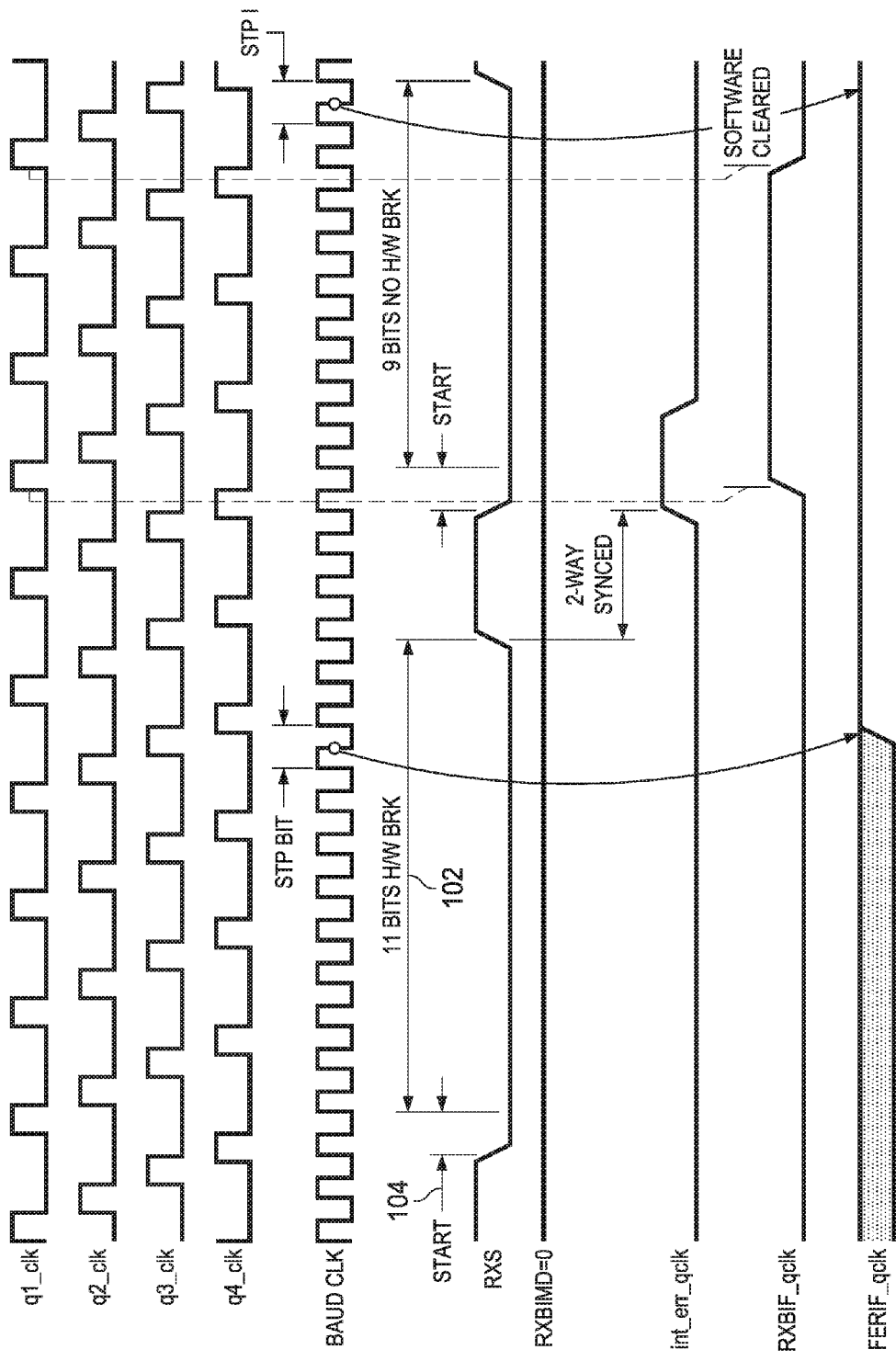
FIG. 1 illustrates a BRK received by a UART at the beginning of a byte, in accordance with certain embodiments of the present disclosure.

Certain legacy UARTs used by many microcontrollers have no special logic to detect break ("BRK") characters. In some embodiments, a BRK is eight bits of zeros with a Framing Error. FIG. 1 illustrates a BRK 102 received by a UART at the beginning of a byte 104, in accordance with certain embodiments of the present disclosure. The receiving line (e.g., "RXS") may be pulled low and after a start bit stays low for 11 clock cycles indicating a BRK. Normally, the receiver would start its reception decoding which would cause an error (e.g., FERIF_qclk) after eight clocks and a stop bit clock. A conventional receiver may not be able to detect anything else but such an error. Contrary to this, an enhanced system according to various embodiments, is able to detect such BRK automatically. Due to the fact that a BRK is a predetermined length (e.g., eleven clocks) the BRK detector counter—as described in more detail below with reference to FIG. 5—can detect this BRK signal and generate the respective detection signals. The counter may begin with a falling edge of the receiving line and stop with the next rising edge. If the counter reaches the predetermined BRK number, a BRK is detected.

In certain known systems, if the UART receives a BRK in the middle of a byte, the UART may not recognize the BRK.

Figure 2:
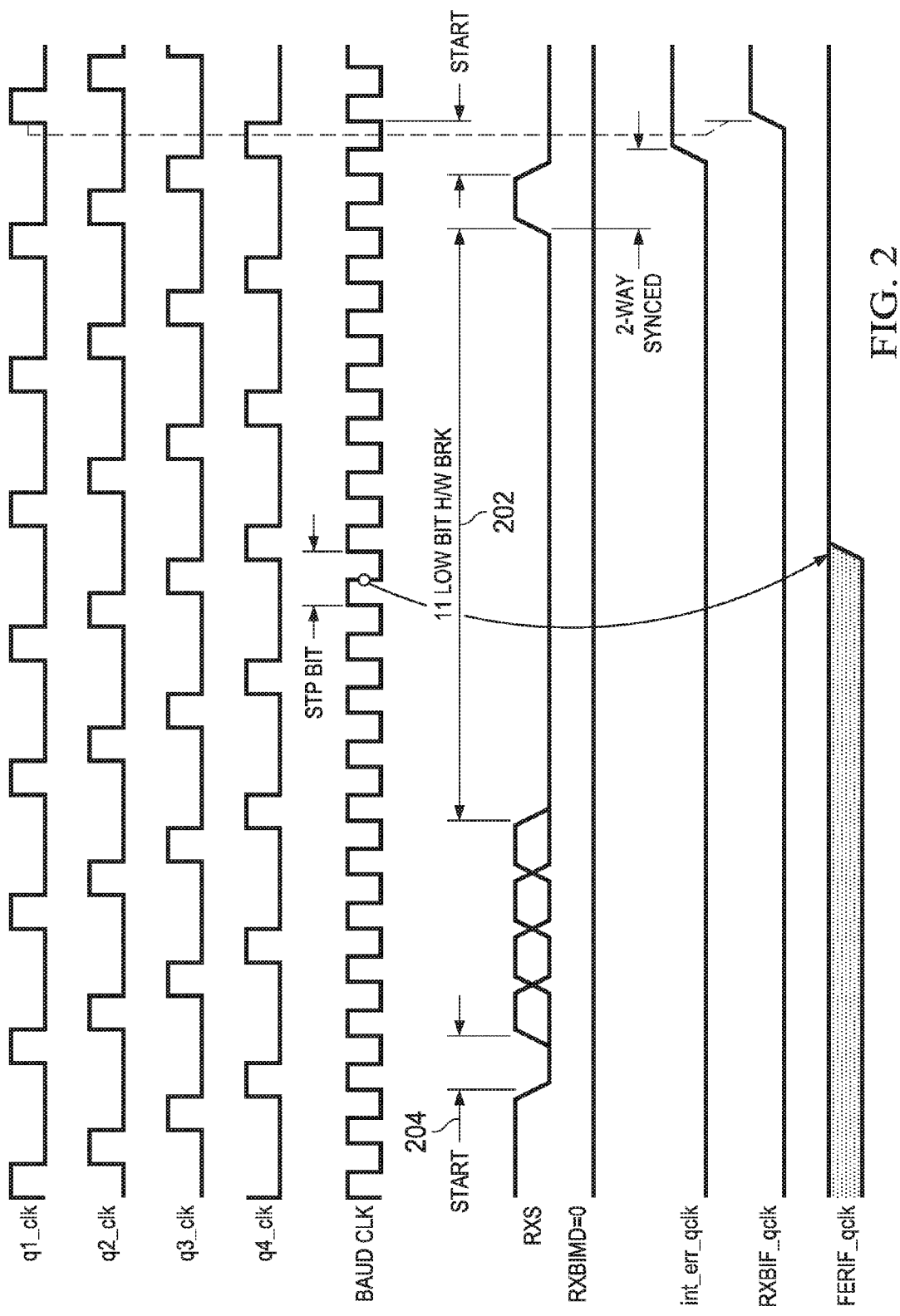
FIG. 2 illustrates a BRK received by a UART in the middle of a byte, in accordance with certain embodiments of the present disclosure.

FIG. 2 illustrates a BRK 202 received by a UART in the middle of a byte 204, in accordance with certain embodiments of the present disclosure. This may not be ideal operation for protocols such as a local interconnect network ("LIN"). According to various embodiments, a UART module may comprise a hardware counter within its receiver unit that signals a BRK no matter when it occurs. According to various embodiments, a hardware counter is provided in the interface that counts low periods. Any time the receive ("RX") line goes low, the counter start counting. Depending on the serial data that is transmitted, the BRK detector counter may be set and reset various times until the BRK signal starts. The short stops caused by the serial data will not trigger any detection. However, the BRK signal in a mid-byte transmission can be easily detected by the counter and a respective detection signal can be generated.

Figure 3:
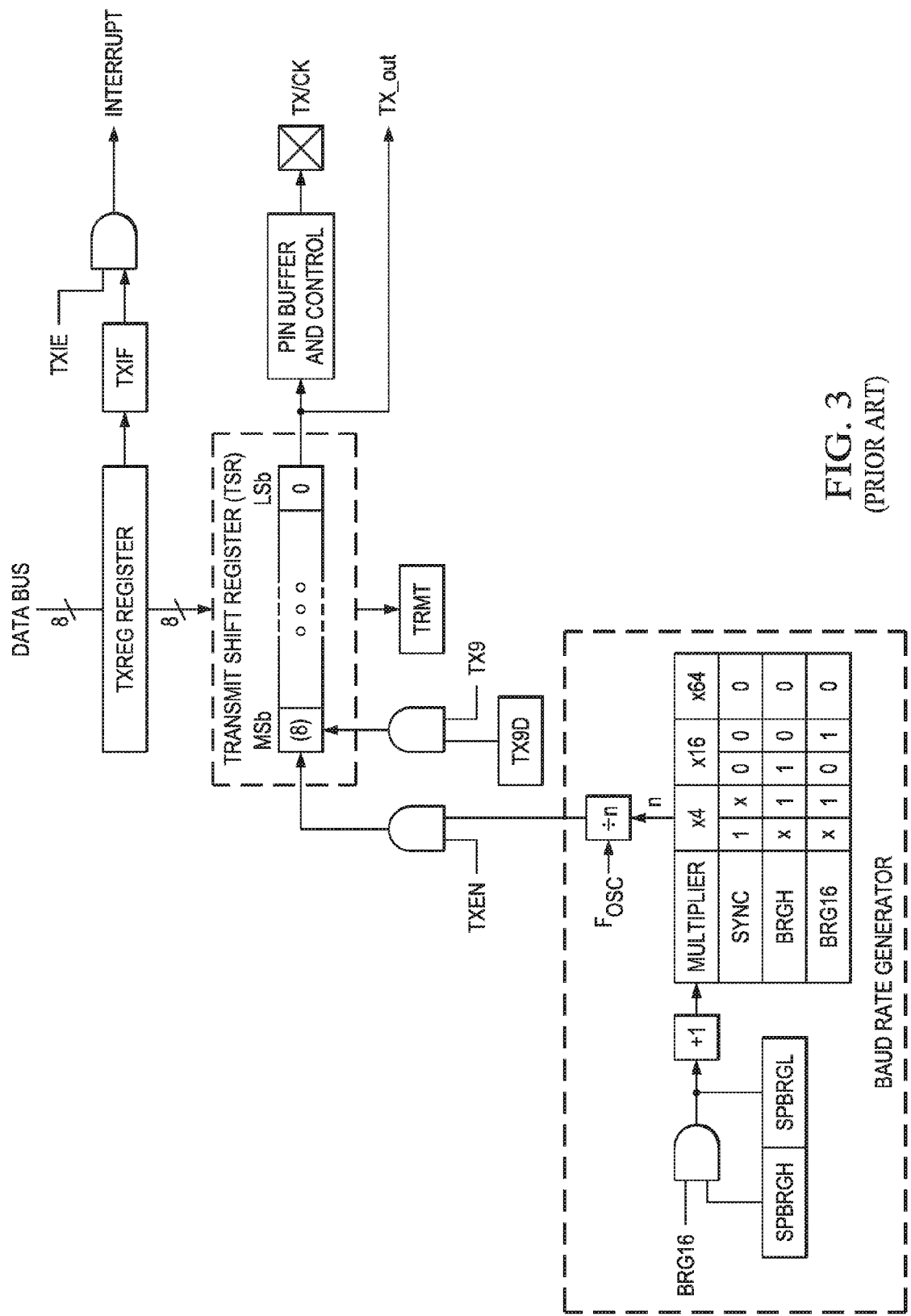
FIG. 3 illustrates an example known transmitter module of a known universal asynchronous receiver transmitter as implemented in known microcontrollers.
Figure 4:
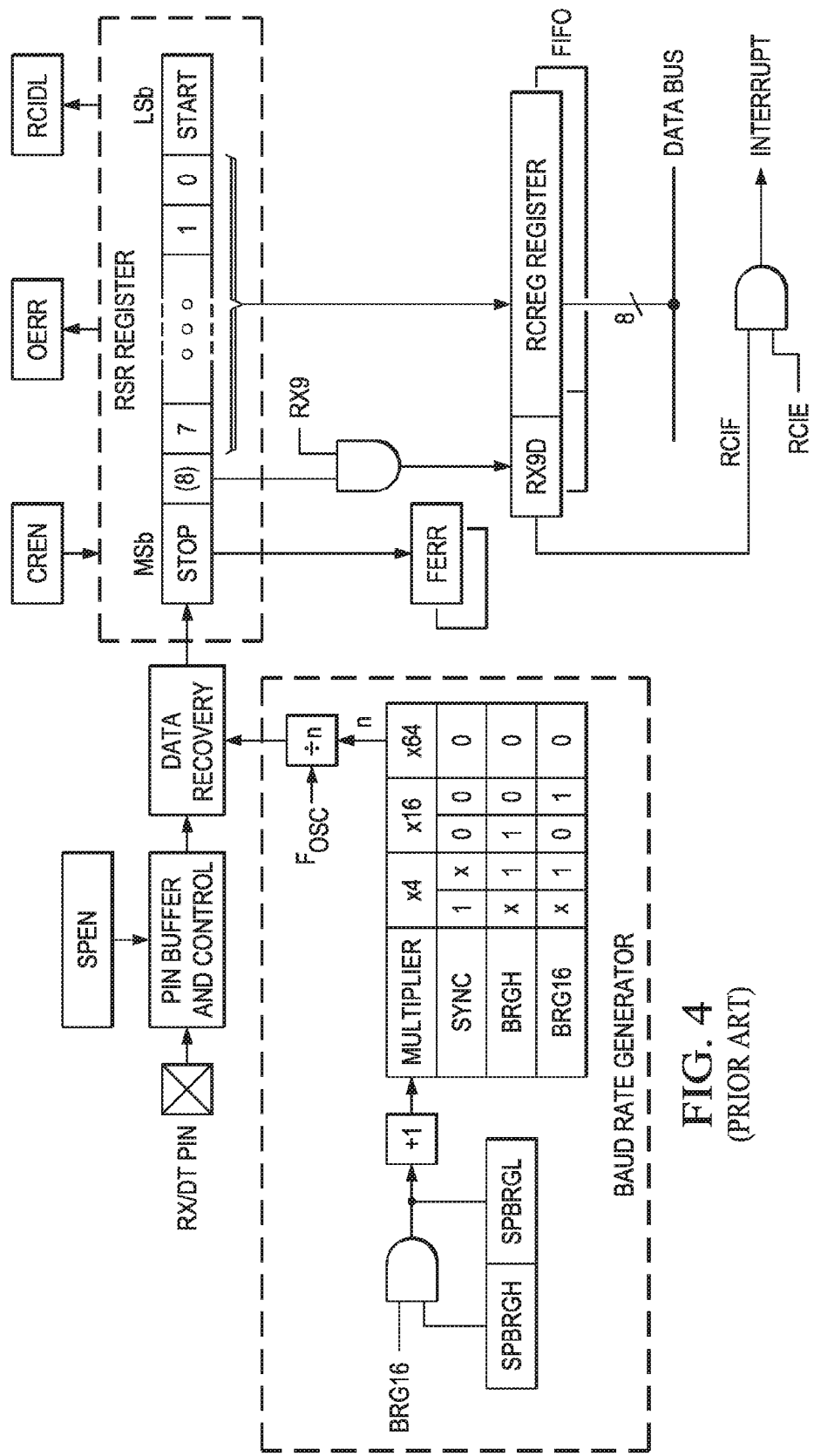
FIG. 4 illustrates an example known receiver module of a known universal asynchronous receiver transmitter as implemented in known microcontrollers.

FIG. 3 illustrates an example known transmitter module of a known universal asynchronous receiver transmitter as implemented in known microcontrollers. FIG. 4 illustrates an example known receiver module of a known universal asynchronous receiver transmitter as implemented in known microcontrollers. The UART module is a serial I/O communications peripheral. It contains all the clock generators, shift registers and data buffers necessary to perform an input or output serial data transfer independent of device program execution. The UART, also known as a Serial Communications Interface (SCI), can be configured as a full-duplex asynchronous system. Full-Duplex mode is useful for communications with peripheral systems, such as CRT terminals and personal computers.

In various embodiments, the UART module illustrated in FIGS. 3-4 may include amongst others the following capabilities: Full-duplex asynchronous transmit and receive; Two-character input buffer; One-character output buffer; Programmable eight-bit or nine-bit character length; Address detection in 9-bit mode; Input buffer overrun error detection; Received character framing error detection; Sleep operation; etc.

In various embodiments, the UART module implements the following additional features, making it more suited for use in Local Interconnect Network ("LIN") bus systems: Automatic detection and calibration of the baud rate; Wake-up on Break reception; thirteen-bit Break character transmit. During Sleep mode, all clocks to the UART are suspended. Because of this, the Baud Rate Generator is inactive and a proper character reception cannot be performed. The Auto-Wake-up feature allows the controller to wake-up due to activity on the receive/data transmission ("RX/DT") line. In some embodiments, this feature may be available only in Asynchronous mode. An Auto-Wake-up feature may enabled by setting a certain memory portion of the UART. For example, the Auto-Wake-up feature may be enabled by setting the wake-up enable ("WUE") bit of a BAUDCON register. Once set, the normal receive sequence on RX/DT may be disabled, and an Enhanced Universal Synchronous Asynchronous Receiver Transmitter ("EUSART") may remain in an Idle state, monitoring for a wake-up event independent of the CPU mode. A wake-up event may consist of, for example, a high-to-low transition on the RX/DT line. (This coincides with the start of a Sync Break or a wake-up signal character for the LIN protocol.) The EUSART module may generate a receive interrupt flag (e.g., an RCIF interrupt) coincident with the wake-up event. The interrupt may be generated synchronously to the Q clocks in normal CPU operating modes, and asynchronously if the device is in Sleep mode. The interrupt condition may be cleared by reading another memory portion of the UART (e.g., the RCREG register). The WUE bit may be automatically cleared by the low-to-high transition on the RX line at the end of the Break. This signals to the user that the Break event is over. At this point, the EUSART module may be in Idle mode waiting to receive the next character.

The UART may transmit and receive data using a standard non-return-to-zero (NRZ) format. NRZ is implemented with two levels: a high-voltage output ("VOH") mark state which represents a '1' data bit, and a low-voltage output ("VOL") space state which represents a '0' data bit. NRZ refers to the fact that consecutively transmitted data bits of the same value stay at the output level of that bit without returning to a neutral level between each bit transmission. An NRZ transmission port idles in the mark state. Each character transmission consists of one Start bit followed by eight or nine data bits and is always terminated by one or more Stop bits. The Start bit is always a space and the Stop bits are always marks. The most common data format is eight bits. Each transmitted bit persists for a period of one/(Baud Rate). An on-chip dedicated eight-bit/sixteen-bit Baud Rate Generator is used to derive standard baud rate frequencies from the system oscillator. The UART may transmit and receive the least significant bit first. The UART's transmitter and receiver are functionally independent, but may share the same data format and baud rate. Parity may not be supported according to some embodiments, but may be implemented in software and stored as the ninth data bit.

An Asynchronous mode is typically used in certain embodiments implementing an RS-232 standard. Referring again to FIG. 4, in some embodiments, data may be received on RX/DT 402 pin, which may drive data recovery block 404. In some embodiments, data recovery block 404 may be a high-speed shifter operating at a higher rate than the baud rate (e.g., sixteen times the baud rate). In some embodiments, receiver 400 may also include serial Receive Shift Register ("RSR") 406. RSR 406 may be a shifter that operates at or about the bit rate. When all eight or nine bits of the character have been shifted in, they are immediately transferred to a First-In-First-Out ("FIFO") memory 408. In some embodiments, memory 408 may be a two-character FIFO. In some embodiments, the FIFO buffering allows reception of two complete characters and the start of a third character before software must start servicing the UART receiver. The FIFO and RSR registers are not directly accessible by software according to some embodiments. Access to the received data may be given via a memory portion of the UART (e.g., the RCREG register).

Figure 5:
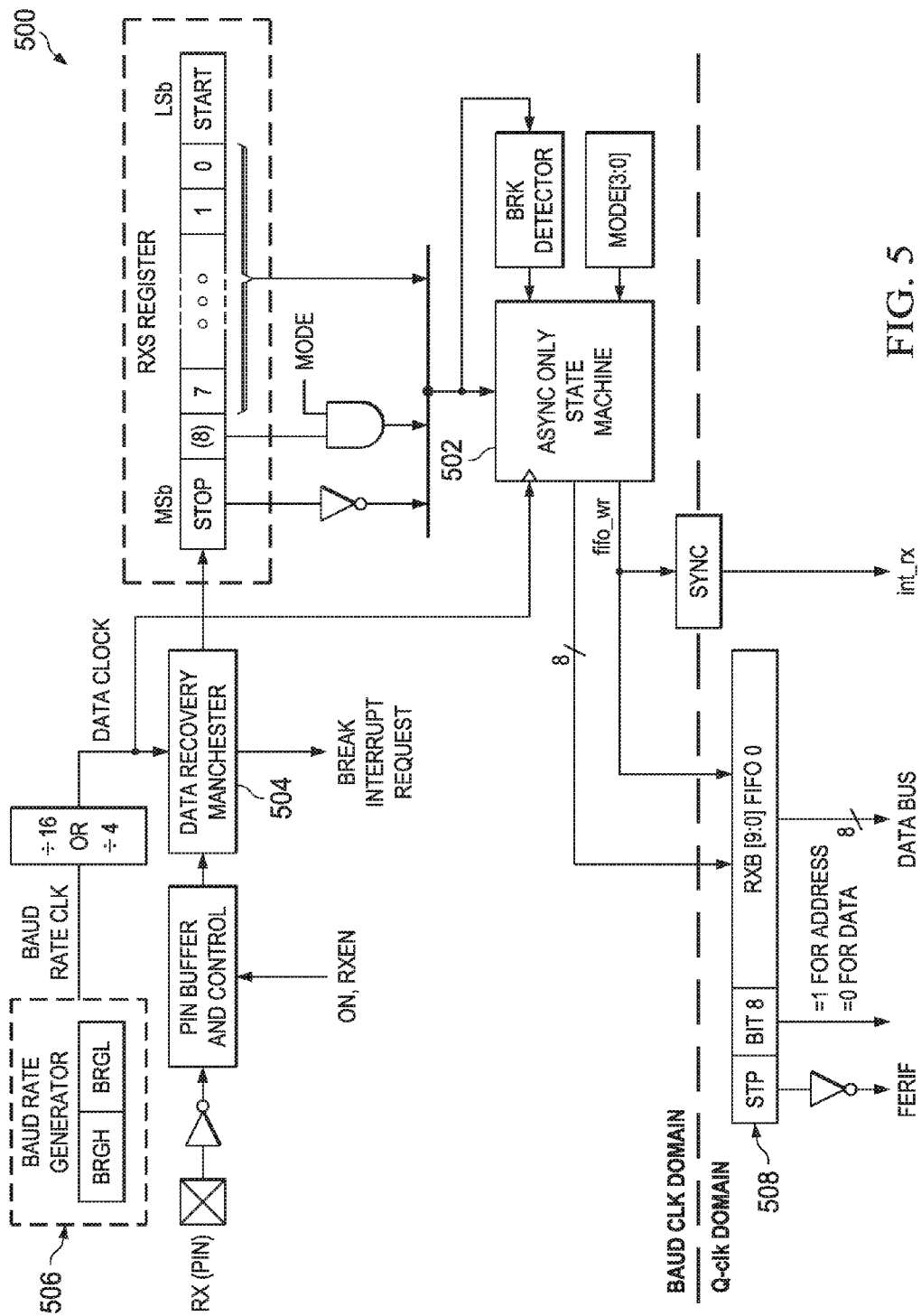
FIG. 5 illustrates a receiver unit for a UART or any other similar serial interface unit operable to provide for an automatic BRK detector, in accordance with certain embodiments of the present disclosure.

FIG. 5 illustrates a receiver unit 500 for a UART or any other similar serial interface unit operable to provide for an automatic BRK detector, in accordance with certain embodiments of the present disclosure. In some embodiments, receiver unit 500 may be clocked by programmable receiver clock 504. In some embodiments, programmable receiver clock 504 may be clocked by baud rate generator 506. Programmable receiver clock 504 may be operable to sample an incoming data signal (e.g., data incoming at receiver pin 508).

In some embodiments, receiver unit 500 may include a counter clocked by programmable receiver clock 504. The counter may be reset to start counting with a portion of the data signal and to trigger a BRK detection signal if the counter reaches a programmable threshold value. For example, as described in more detail above with reference to FIGS. 1-4, a BRK may include eleven clock cycles. Thus, if the counter reaches eleven, then it may trigger a BRK detection signal.

In some embodiments, the counter may include configurable state machine 502 coupled to BRK detector 504. In some embodiments, configuration of state machine 502 may be controlled by a configuration register signal (e.g., MODE [3:0]). For example, as illustrated in FIG. 5, a configuration register signal (MODE[3:0]) has four bits and may allow for various settings. Other registers may be used. In some embodiments, state machine 502 may be coupled with BRK detector 504. In various embodiments, BRK detector 504 may be a counter the starts and stops on an incoming falling and rising edge, respectively of the received signal.

In some embodiments, the counter may be further coupled to a memory buffer 508. For example, the counter may be coupled to a first-in, first-out memory buffer such as the example buffer illustrated in FIG. 5.

According to various embodiments, a UART is described that allows for automatic detection of a BRK regardless of when that BRK is received.

What is claimed is:

1. A universal asynchronous receiver/transmitter (UART) module comprising:
   a receiver unit being clocked by a programmable receiver clock configured to sample an incoming data signal and comprising a counter clocked by said receiver clock, wherein the counter is reset to start counting with every falling edge of the data signal and to trigger a break (BRK) detection signal if the counter reaches a programmable threshold value;
   wherein the counter stops counting for triggering the BRK detection signal upon a rising edge of the data signal.

2. The UART according to claim 1, wherein the threshold value can be programmed to be 11.

3. The UART according to claim 1, wherein the receiver unit comprises a state machine to control the counter.

4. The UART according to claim 3, wherein the state machine is programmable to operate in different operating modes.

5. The UART according to claim 3, further comprising a first in first out buffer memory receiving a plurality sampled data.

6. The UART according to claim 1, wherein the programmable receiver clock is coupled to a baud rate generator.

7. A microprocessor comprising:
   a universal asynchronous receiver/transmitter (UART) module comprising a receiver unit being clocked by a programmable receiver clock configured to sample an incoming data signal and comprising a counter clocked by said receiver clock, wherein the counter is reset to start counting with every falling edge of the data signal and to trigger a break (BRK) detection signal if the counter reaches a programmable threshold value;
   wherein the counter stops counting for triggering the BRK detection signal upon a rising edge of the data signal.

8. The microprocessor according to claim 7, wherein the threshold value can be programmed to be 11.

9. The microprocessor according to claim 7, wherein the receiver unit comprises a state machine to control the counter.

10. The microprocessor according to claim 9, wherein the state machine is programmable to operate in different operating modes.

11. The microprocessor according to claim 9, further comprising a first in first out buffer memory receiving a plurality sampled data.

12. The microprocessor according to claim 7, wherein the programmable receiver clock is coupled to a baud rate generator.

13. A method for controlling a universal asynchronous receiver/transmitter (UART) module, the method comprising:
   clocking a receiver unit by a programmable receiver clock configured to sample an incoming data signal;
   resetting a counter clocked by said programmable receiver clock, wherein the counter is reset to start counting with every falling edge of the data signal;
   triggering a break (BRK) detection signal if the counter reaches a programmable threshold value; and
   ceasing counting for triggering the BRK detection signal upon a rising edge of the data signal.

14. The method according to claim 13, wherein the threshold value can be programmed to be 11.

15. The method according to claim 13, wherein the receiver unit comprises a state machine to control the counter.

16. The method according to claim 15, wherein the state machine is programmable to operate in different operating modes.

17. The method according to claim 15, further comprising transmitting a plurality of sampled data to a first in first out buffer memory.

* * * * *